Oct. 9, 1928.  
J. LAESSKER  
1,687,252  
MACHINE FOR FORMING INTERNAL GROOVES IN GEARS, ETC  
Filed Aug. 1, 1927
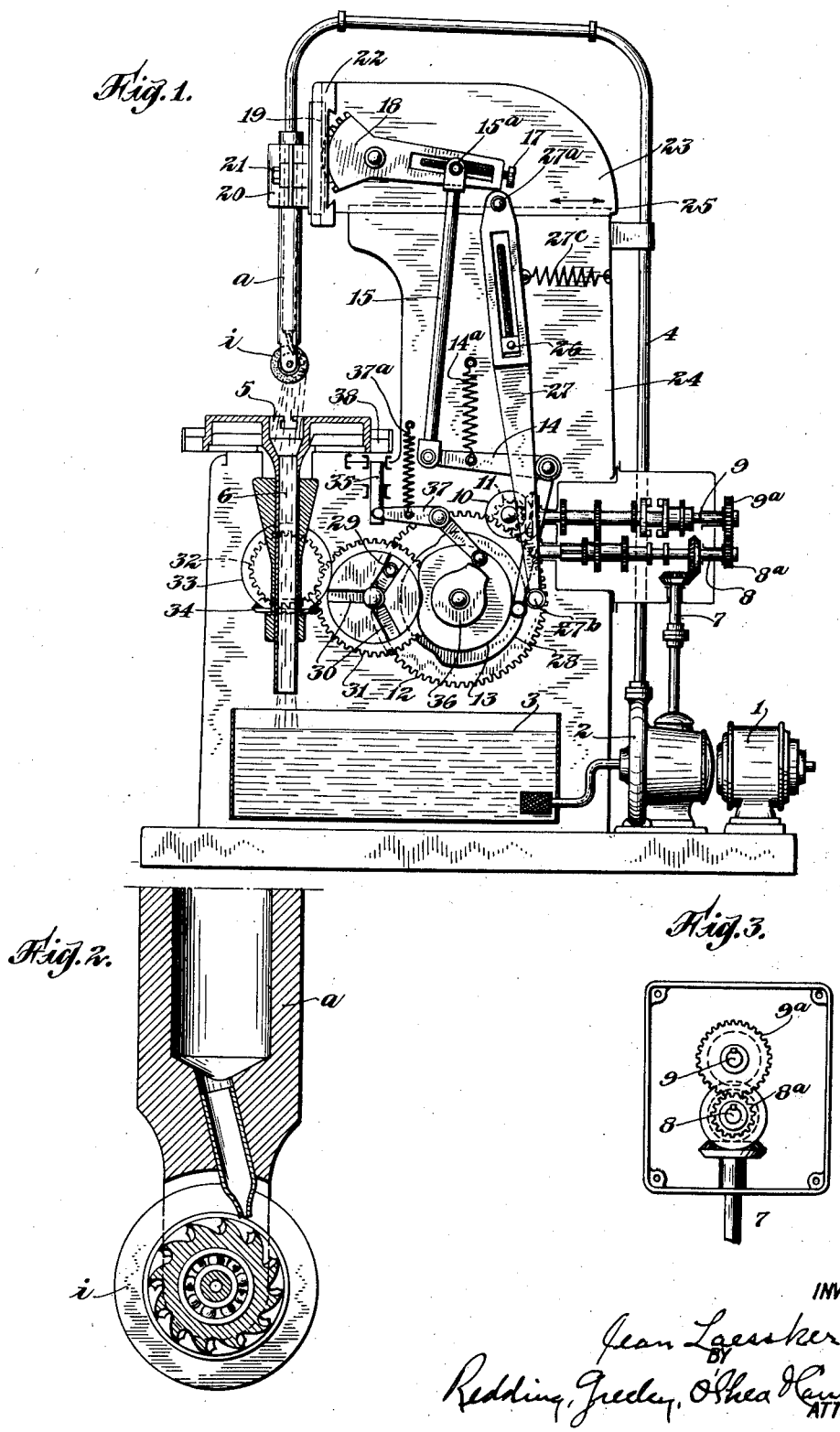
INVENTOR  
Jean Laessker  
BY  
Redding, Greeley, O'Shea & Campbell  
ATTORNEYS Patented Oct. 9, 1928.

1,687,252

UNITED STATES PATENT OFFICE.

JEAN LAESSKER, OF ARBON, SWITZERLAND, ASSIGNOR TO SOCIETE ANONYME ADOLPHE SAURER, OF ARBON, SWITZERLAND, A CORPORATION OF SWITZERLAND.

MACHINE FOR FORMING INTERNAL GROOVES IN GEARS, ETC.

Application filed August 1, 1927. Serial No. 209,657.

This invention has for its object to provide a machine, mainly automatic in its operation, for the grinding of surfaces not readily accessible, such as the internal grooves of gears which require to be grooved internally for engagement with some part of the shaft on which the gears are mounted. There has been devised heretofore a grinding tool for such purposes in which the grinding disc is driven by a turbine or other fluid impelled wheel and the present invention is particularly concerned with the means for supporting and effecting the necessary movements of such a grinding tool in a machine which is automatic in its character.

The invention will be more fully explained hereinafter with reference to the accompanying drawing in which it is illustrated and in which:

Figure 1 is a view in elevation, partly in outline, of a machine constructed in accordance with the invention.

Figure 2 is a detail view, in sectional elevation, of the grinding tool represented in Figure 1.

Figure 3 is a detail view of the change gears indicated conventionally in Figure 1.

In the embodiment of the invention illustrated in Figure 1, the impelling liquid by which the turbine driven tool $i$ is actuated, as indicated in Figure 2, is drawn by a centrifugal pump 2, driven by a motor 1, from a reservoir 3 and is conducted to a suitable pipe 4 to the holder $a$ of the tool $i$, the pipe 4 being provided with telescopic and swivel joints so as to accommodate itself to the movements of the holder $a$.

The gear or other article to be subjected to the action of the tool $i$ is supported upon a work table 5, the table being recessed and provided with a tube 6 through which the oil or other impelling liquid, after it has done its work in driving the tool, may be returned to the tank or reservoir 3 for further circulation. The impelling liquid may thus have an influence in cooling the tool during operation.

In the operation of the machine shown, the tool $i$ has a movement in a vertical direction, that it may be introduced into and withdrawn from the bore of the gear or other article. It may also have a movement in a horizontal plane and in a direction indicated by the plane of the drawing, for the purpose of deepening the cut made by the tool, and it may also have, if desired, a movement in a horizontal plane in a direction at right angles to the direction last mentioned. The work table 5 should also have a movement of rotation about a vertical axis in order that a plurality of grooves may be cut without requiring the gear or other article to be released from the table, to which it may be secured by any usual or suitable means not necessary to be shown herein.

In the machine illustrated, provision is made for effecting automatically all of the movements above mentioned and the mechanical devices through which such movements are effected will now be described.

Through the vertical shaft 7, which may be driven from the motor shaft, movement of rotation is imparted to two parallel, horizontal shafts 8 and 9, which may be interconnected by change gears $8^a$ and $9^a$, as indicated in Figure 3, so that the speed of the shaft 9, and the parts driven therefrom, may be regulated as desired. Through bevel wheels 10, pinion 11 and gear 12, movement of rotation is imparted to a cam disc 13 which, through a bell crank 14, link 15, adjustable by a screw 17, gear segment 18 and vertically sliding rack 19, held in place by a cover 20 and screws 21, effects the desired vertical movement of the holder $a$ and tool $i$. The throw of the gear segment and therefore the movement of the tool $i$ in a vertical direction may be regulated, as will be obvious, by means of the screw 17 which carries the block $15^a$ to which the upper end of the link 15 is connected.

To permit lateral adjustment of the tool to be effected in a direction at right angles to the plane of the drawing, the rack 19 and the cover 20 may be carried by a slide 22 capable of movement in the direction referred to.

To effect movement of the tool $i$ in the horizontal plane, in the direction indicated by the plane of the drawing, the head 23, on which are supported the gear segment 18 and the slide 22, is mounted so as to slide in the desired direction on the frame 24, being guided as indicated at 25. A lever 27 mounted on an adjustable fulcrum 26 secured to the frame 24, is connected at its upper end, as at $27^a$, to the head 23 and at its lower end, as at $27^b$, and carries a roller for coaction with a cam 28 mounted on the same shaft with the gear 12 and the cam disc 13, the bell crank lever 14 and the lever 27 being held in operative relation with the cam discs 13 and 28 respectively, by any suitable means, such as the springs 14ª and 27ᶜ respectively.

It will be understood that for each rotation of the cam discs 13 and 28 the tool holder receives a complete up and down movement and a complete to and fro movement in the direction indicated. The horizontal movement of the tool in a direction at right angles to the plane of the drawing is not designed to be automatic in the machine shown.

If a single groove is to be cut in the gear or other article, it is not necessary to provide for rotation of the work table, but in some cases a plurality of grooves may be required. To effect this without detaching the gear from the work table, the work table itself is arranged to receive a step by step rotation. The gear 12 is shown as carrying a stud 29 which is adapted to enter the radial grooves 30 of a disc suitably mounted on the frame and carrying on the same shaft a gear 31 which meshes with the corresponding gear 32. The latter carries a bevel gear 33, which in turn meshes with the bevel gear 34 on the hollow shaft 6 of the work table 5. Through such mechanism the work table receives a one-third rotation for each complete rotation of the gear 12, thus providing for the formation of three grooves.

It is desirable, however, that during the cutting of each groove the work table shall be locked against movement. For this purpose there is fixed to the shaft of the gear 12 a cam 36 which coacts with a lever 37, contact being maintained by a spring 37ª or other suitable means. A bolt 35, arranged for engagement with a hole 38 in the work table is normally maintained for such engagement but is withdrawn therefrom at each complete rotation of the gear 12, by the action of the cam 36, the dwell of which is long enough to permit the work table to be rotated through one-third of a rotation while it is unlocked.

It will be understood that various changes may be made in details of construction and arrangement to suit the conditions of use of the machine and that the machine may be used for the cutting of external grooves as well as for the cutting of internal grooves.

I claim as my invention:

In a machine for cutting grooves the combination of a work table, a rotary cutting tool above the table, a turbine for driving the cutting tool so arranged that impelling liquid discharged therefrom will contact with the cutting tool to cool it and will fall onto the table, a tank for the impelling liquid, means for withdrawing the impelling liquid from the tank and delivering it to the turbine, and means for conducting the impelling liquid discharged onto the table to the tank.

This specification signed this 19th day of July, A. D. 1927.

JEAN LAESSKER.